United States Patent

Gates et al.

Patent Number: 5,978,863
Date of Patent: *Nov. 2, 1999

[54] HOST ADAPTOR COMPRISING A STATUS SWITCHING CIRCUIT WHICH COUPLES AN OUTPUT LINE TO A FUNCTION INPUT LINE IN RESPONSE TO A FUNCTION ENABLE LINE SIGNAL

[75] Inventors: Stillman F. Gates, Los Gatos; Charles S. Fannin, San Jose, both of Calif.

[73] Assignee: Adaptec, Inc., Milpitas, Calif.

[*] Notice: This patent is subject to a terminal disclaimer.

[21] Appl. No.: 08/876,539

[22] Filed: Jun. 9, 1997

Related U.S. Application Data

[63] Continuation of application No. 08/301,458, Sep. 7, 1994, Pat. No. 5,657,455.

[51] Int. Cl.$^6$ .................................................. G06F 13/12
[52] U.S. Cl. .............................. 710/18; 710/7; 710/100; 710/107; 710/127
[58] Field of Search ...................... 379/93.32; 388/813; 710/100, 107, 127

[56] References Cited

U.S. PATENT DOCUMENTS

| | | | |
|---|---|---|---|
| 4,038,644 | 7/1977 | Duke et al. ................................. | 364/900 |
| 4,419,756 | 12/1983 | Cheng-Quispe et al. ................... | 375/7 |
| 4,564,794 | 1/1986 | Kilen et al. ................................ | 318/314 |
| 4,878,166 | 10/1989 | Johnson et al. ........................... | 364/200 |

OTHER PUBLICATIONS

Data Book, Preliminary, AIC–7870 PCI Bus Master Single–Chip SCSI Host Adapter, Adaptec, pp. 1–1 through 1–8, 2–1 through 2–31, 8–1 through 8–11, Dec., 1993.

Data Book, Preliminary, AIC–7850 PCI Bus Master Single–Chip SCSI Host Adapter, Adaptec, pp. 1–1 through 1–6, 2–1 through 2–23, 8–1 through 8–11, Feb. 1994.

*Primary Examiner*—Meng-Ai T. An
*Assistant Examiner*—Chien Yuan
*Attorney, Agent, or Firm*—Skjerven, Morrill, MacPherson, Franklin & Friel; Edward C. Kwok; Omkar K. Suryadevara

[57] ABSTRACT

A host adapter for transferring data between a system bus and an input/output (I/O) bus is implemented as an integrated circuit having a data transfer circuit and a status indicator circuit. The status indicator circuit selectively supplies one of a number of status signals from the data transfer circuit as a signal on a status indicator terminal of the host adapter. Therefore, a light emitting diode connected to the status indicator terminal indicates in real time the status of data transfer, such as usage of the system bus, or I/O bus, or execution time of one or more instructions by the host adapter.

9 Claims, 15 Drawing Sheets

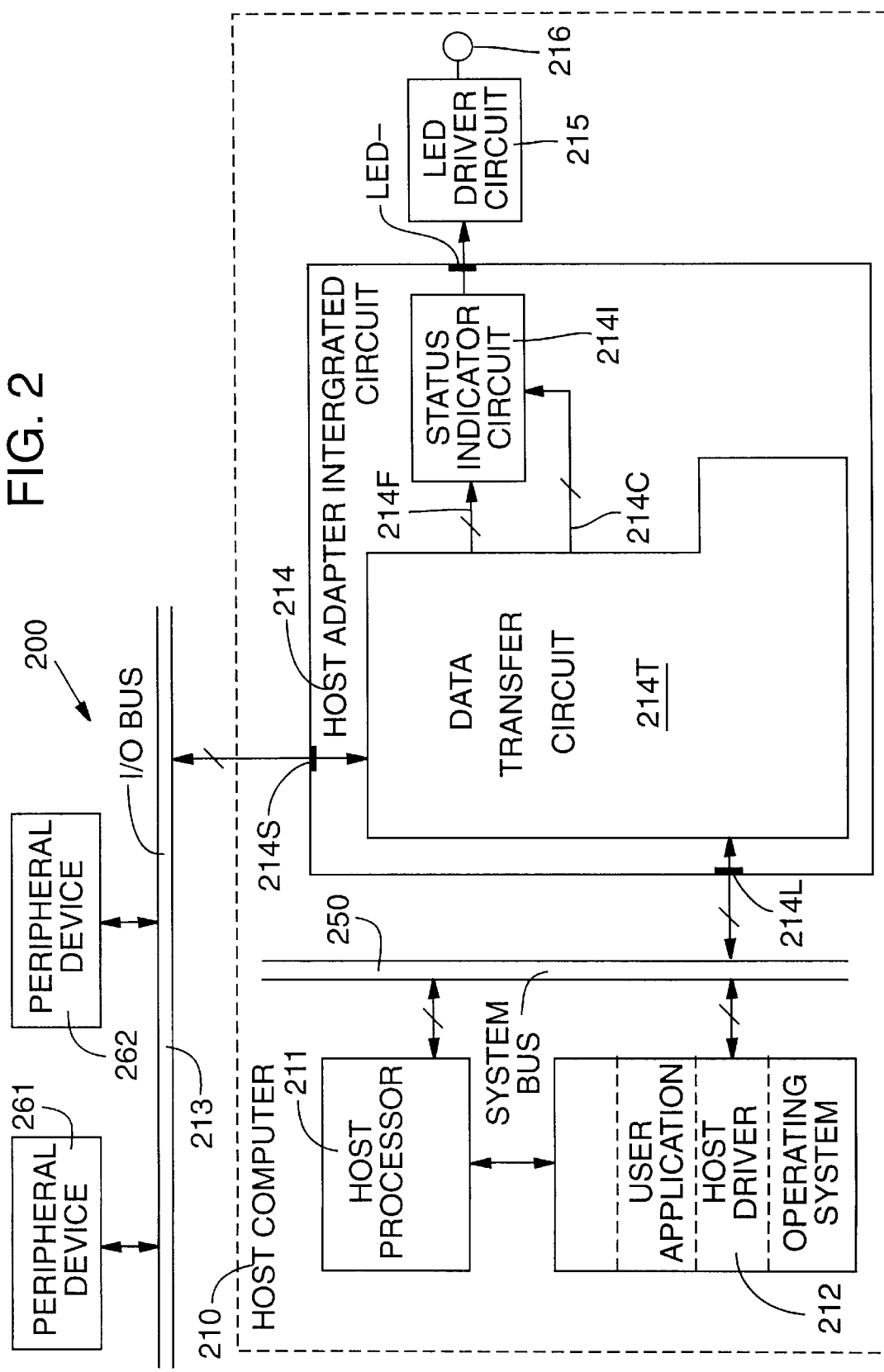

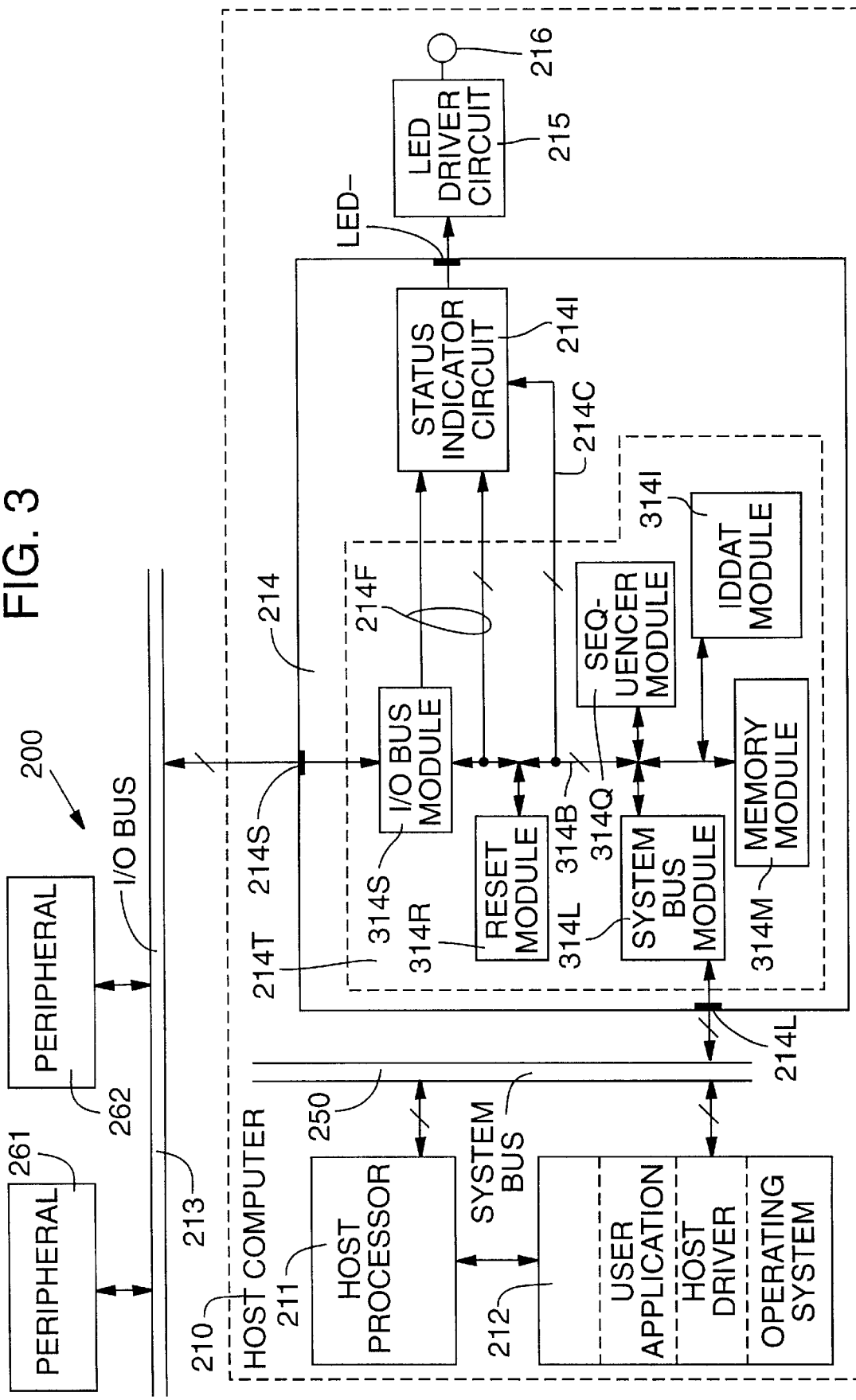

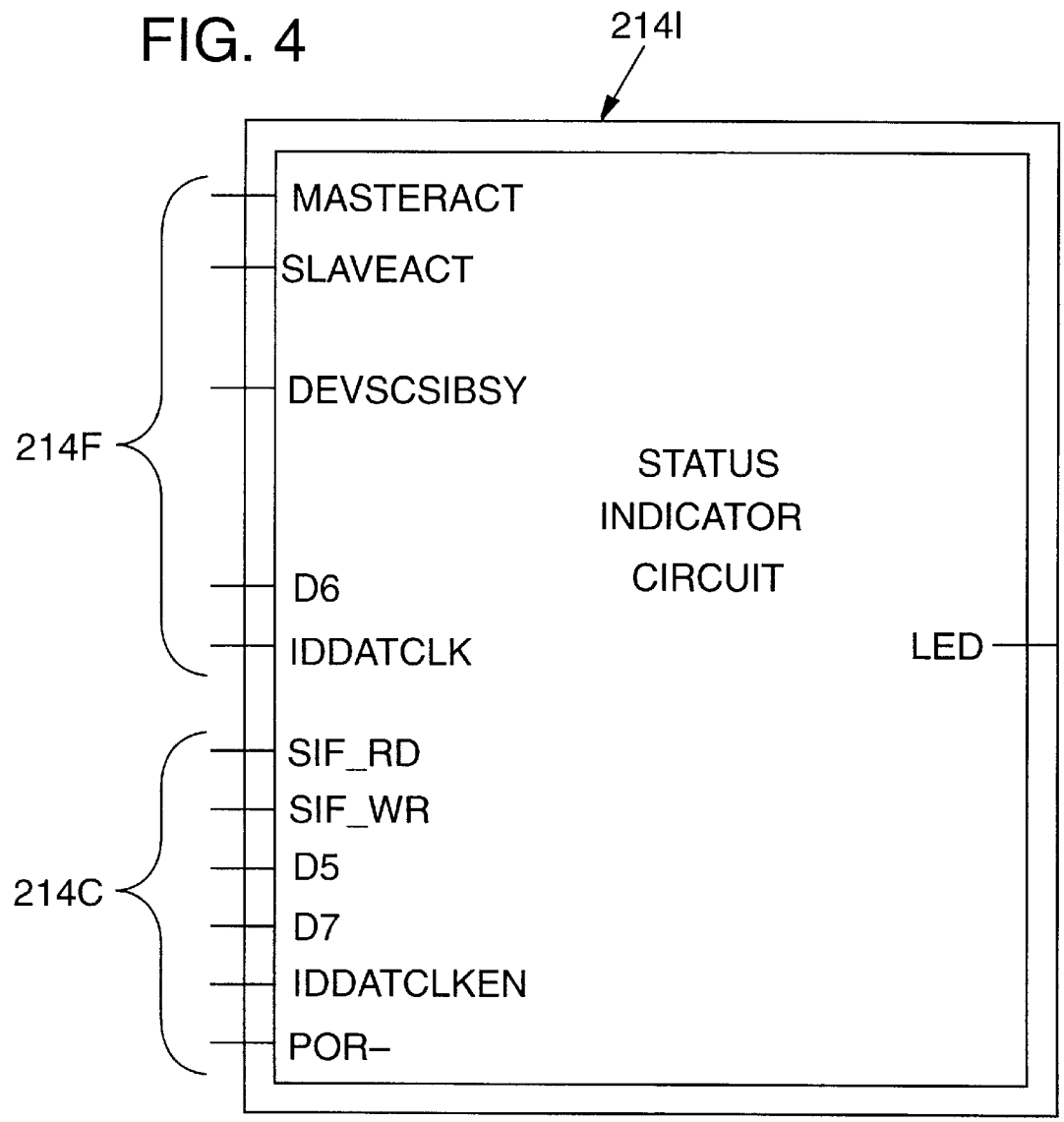

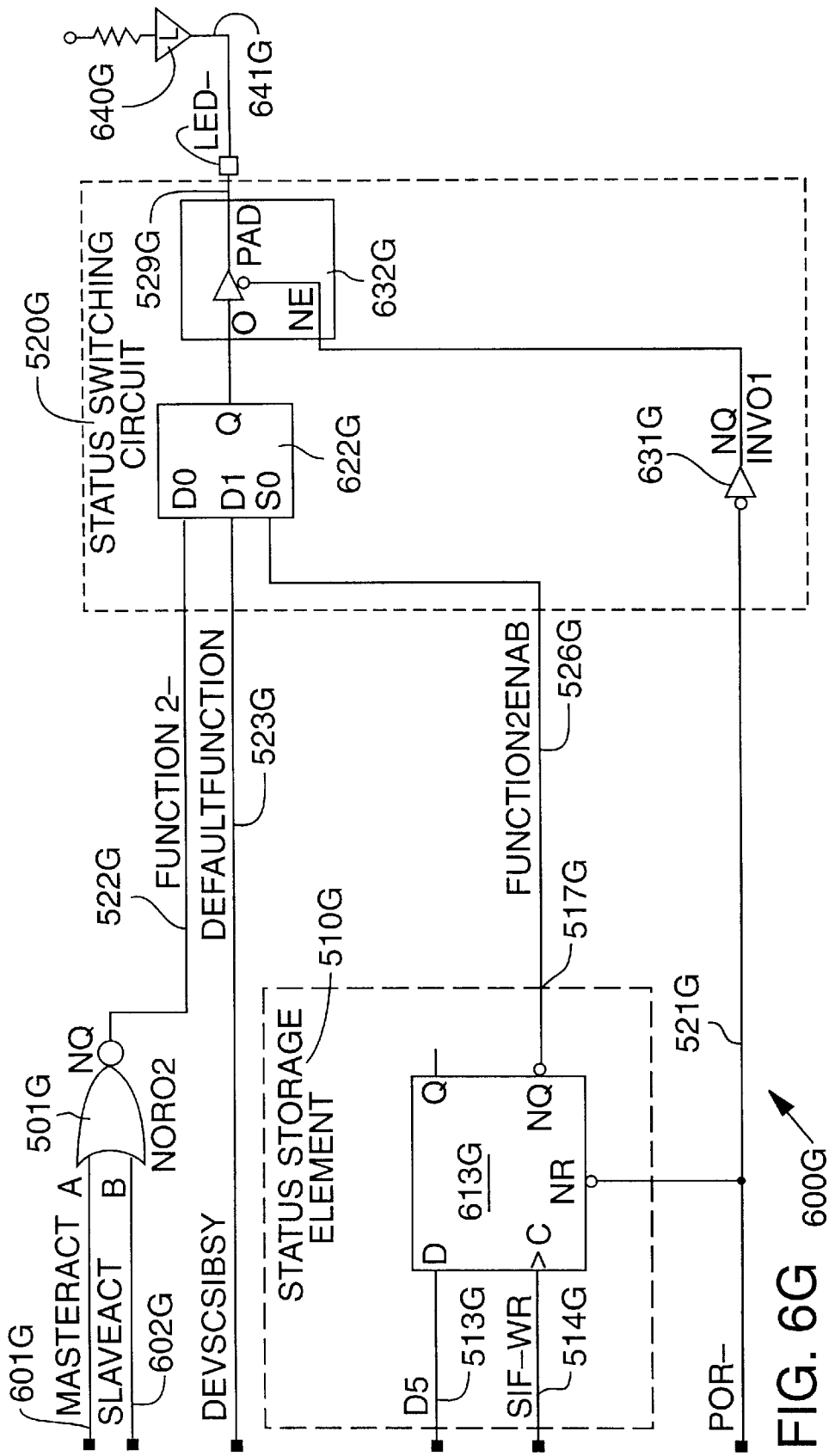

HOST ADAPTOR COMPRISING A STATUS SWITCHING CIRCUIT WHICH COUPLES AN OUTPUT LINE TO A FUNCTION INPUT LINE IN RESPONSE TO A FUNCTION ENABLE LINE SIGNAL

CONTINUATION

The present application is a continuation of application Ser. No. 08/301,458, issued as U.S. Pat. No. 5,657,455, filed Sep. 7, 1994.

FIELD OF THE INVENTION

This invention generally relates to a status indicator for a disk drive and in particular to a host adapter integrated circuit having a terminal for indicating the status of one or more functions of the host adapter integrated circuit.

BACKGROUND OF THE INVENTION

FIG. 1A illustrates a prior art computer system 100 including a host processor 116, a host adapter device 110 and a peripheral device 130, e.g. a disk drive. Host processor 116 and host adapter device 110 are connected to each other by a system bus 120. Host adapter device 110 includes a local microprocessor 111 connected to a local bus 115. Host adapter device 110 also includes a host adapter integrated circuit 112 that transfers data between local bus 115 and system bus 120, between local bus 115 and I/O bus 114, and between system bus 120 and I/O bus 114.

In computer system 100, the status of use of I/O bus 114 is indicated by a light emitting diode (LED) 113 in host adapter device 110. LED 113 may be mounted physically adjacent peripheral device 130 and indicates to a user that host adapter device 110 is accessing peripheral device 130. Local microprocessor 111 drives a signal to turn on LED 113 whenever local microprocessor 111 issues a command to access peripheral device 130. Subsequently, when the issued command is completed, local microprocessor 111 drives a signal to turn off LED 113. Therefore, LED 113 does not indicate use of I/O bus 114 in real time.

FIG. 1B illustrates another computer system 150, similar to computer system 100 of FIG. 1A except for host adapter device 140. Host adapter device 140 includes a local microprocessor 141 and two host adapter integrated circuits 143 and 142 all connected to local bus 145. Host adapter integrated circuits 142 and 143 have LEDs 142L and 143L respectively, each LED connected to the busy signal line BSY of I/O bus 114. LEDs 142L and 143L indicate usage of I/O bus 114 in real time. However, both LEDs 142L and 143L are turned on simultaneously by any activity that causes an active signal on the busy signal line BSY of I/O bus 114. For instance, when only host adapter integrated circuit 142 is used by local microprocessor 141 to communicate with peripheral device 130, both LEDs 142L and 143L are turned on because both LEDs are tied to the same busy signal line BSY.

SUMMARY OF THE INVENTION

In accordance with this invention, a host adapter for transferring data between an input-output bus, henceforth, an I/O bus, and a system bus is implemented as an integrated circuit that has a data transfer circuit to transfer data and a status indicator circuit to indicate status of various functions of the data transfer circuit in real time.

The data transfer circuit generates various signals that drive the status indicator circuit. The modules and configuration of the modules in the data transfer circuit are not essential aspects of this invention.

The status indicator circuit selects one of the signals from the data transfer circuit to drive a terminal of the host adapter integrated circuit, henceforth referred to as the status indicator terminal, that is coupled to a light emitting diode (LED). When a host adapter device has multiple host adapter integrated circuits, each LED is turned on independently because each host adapter integrated circuit has its own status indicator circuit.

The status indicator circuit includes a status storage element coupled to a status switching circuit. The status switching circuit has a default function input line, a first function input line and a corresponding first function enable line, a second function input line and a corresponding second function enable line, a third function input line and a corresponding third function enable line and a function disable line, i.e. a plurality of function input lines, a plurality of function enable lines and a function disable line. The status switching circuit also has an output line coupled to the status indicator terminal of the host adapter integrated circuit. The status switching circuit selectively couples and decouples the output line to a function input line in response to an active signal on the corresponding function enable line.

The status switching circuit prioritizes the coupling and decoupling of the output line to the various function input lines if more than one function enable line has an active signal. Specifically, in response to an active signal on the function disable line, the status switching circuit drives a signal on the status indicator terminal inactive, irrespective of the signals on the other function enable lines. Subsequently, in response to an inactive signal on the function disable line, the status switching circuit couples the output line to the first function input line that carries an active signal, if the first function enable line has an active signal. Hence the duration of the inactive signal on the status indicator terminal indicates the time needed to reset the host adapter integrated circuit.

In one embodiment, the data transfer circuit supplies a clock signal on a third function input line to clock identification data from a pin of host adapter integrated circuit. Identification data can be clocked in when the status switching circuit connects the third function input line to the output line, in response to an active signal on the corresponding third function enable line, if the signal on the function disable line is inactive, irrespective of the signals on the other function enable lines.

In one embodiment, the data transfer circuit includes a system bus module that is connected to and drives signals on a master status line and a slave status line. The status indicator circuit combines the signals on the master status line and the slave status line to generate a combined master/slave signal on the second function input line of the status switching circuit. Therefore, system bus usage by the host adapter integrated circuit can be monitored when the status switching circuit connects the second function input line to the output line, in response to an active signal on the corresponding second function enable line, if the signals on the function disable line and the third function enable line are inactive, irrespective of the signal on the first function enable line.

In one embodiment, the status storage element of the status indicator circuit has a first enable bit and a first input bit. The first function enable line and the corresponding first function input line of the status switching circuit are coupled to the first enable bit and the first input bit respectively. The status storage element is in the address space of the firmware of the host adapter integrated circuit and also in the address space of any device connected to the system bus. Therefore, statements that set and clear the first input bit drive a signal on the first function input line active and inactive respectively. Therefore execution of a write statement allows firmware or software to be monitored for debugging or performance measurement, when the status switching circuit connects the first function input line to the output line, in response to an active signal on the corresponding first function enable line driven by the first enable bit, if the signals on the function disable line, the third function enable line and the second function enable line are inactive.

In response to inactive signals on each and every one of the function enable lines, the status switching circuit couples the output line to the default function input line, that in one embodiment indicates real time usage of the local bus. Therefore, a LED indicates status of any portion of the host adapter integrated circuit that is connected by the status switching circuit to the status indicator terminal.

BRIEF DESCRIPTION OF THE DRAWINGS

FIG. 2 illustrates a high level block diagram of one embodiment of a computer system including a host adapter integrated circuit having a status indicator terminal in accordance with this invention.

FIG. 3 illustrates a low level block diagram showing the modules of the data transfer circuit included in the host adapter integrated circuit of FIG. 2.

FIG. 4 illustrates a signal interface for one embodiment of the status indicator circuit included in the host adapter integrated circuit of FIGS. 2 and 3.

FIGS. 6A–6H illustrate several embodiments of a status indicator circuit.

DETAILED DESCRIPTION

Figure 1A:
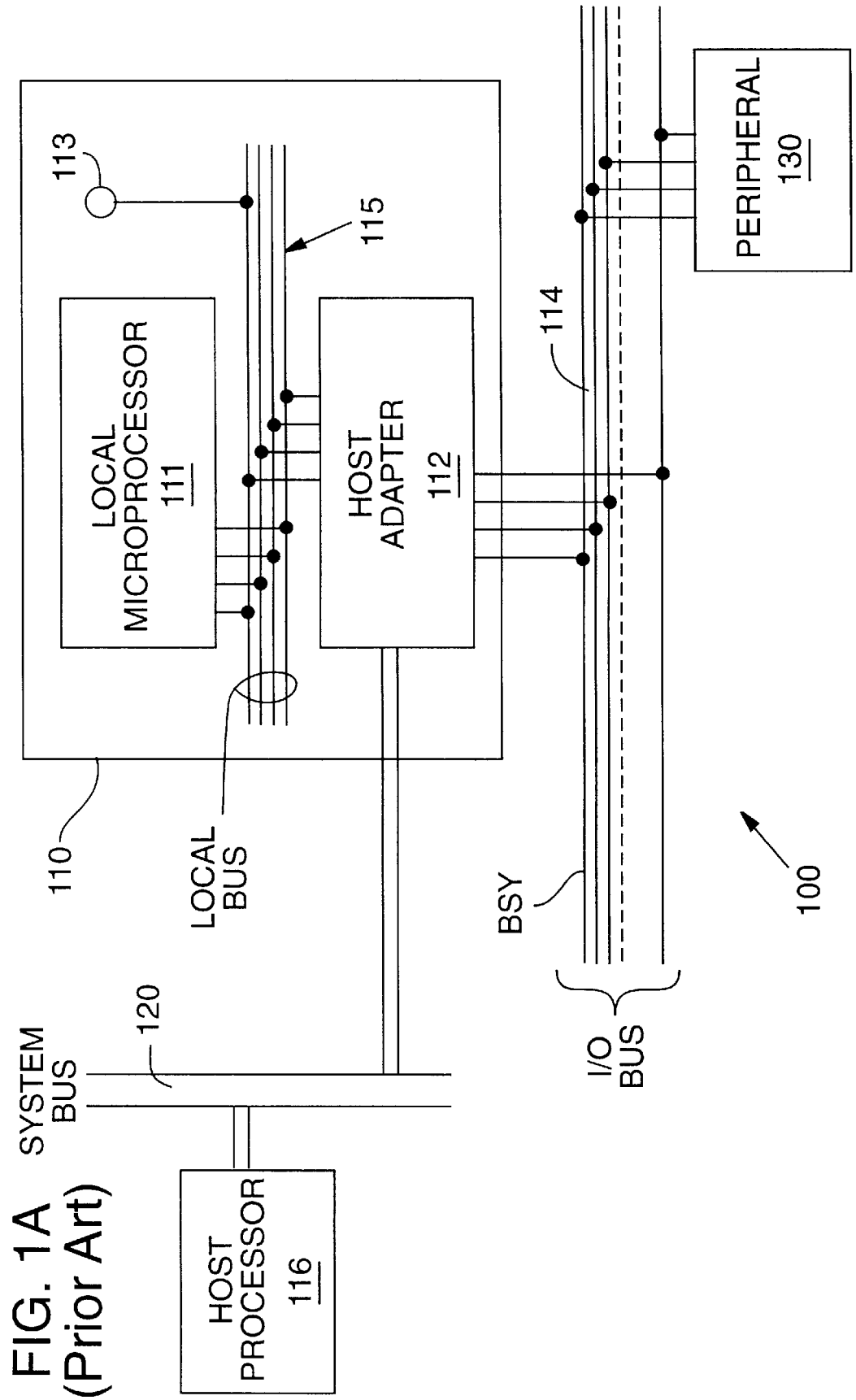
FIG. 1A illustrates a prior art computer system having a host adapter integrated circuit for data transfer between an I/O bus and a system bus or local bus.
Figure 1B:
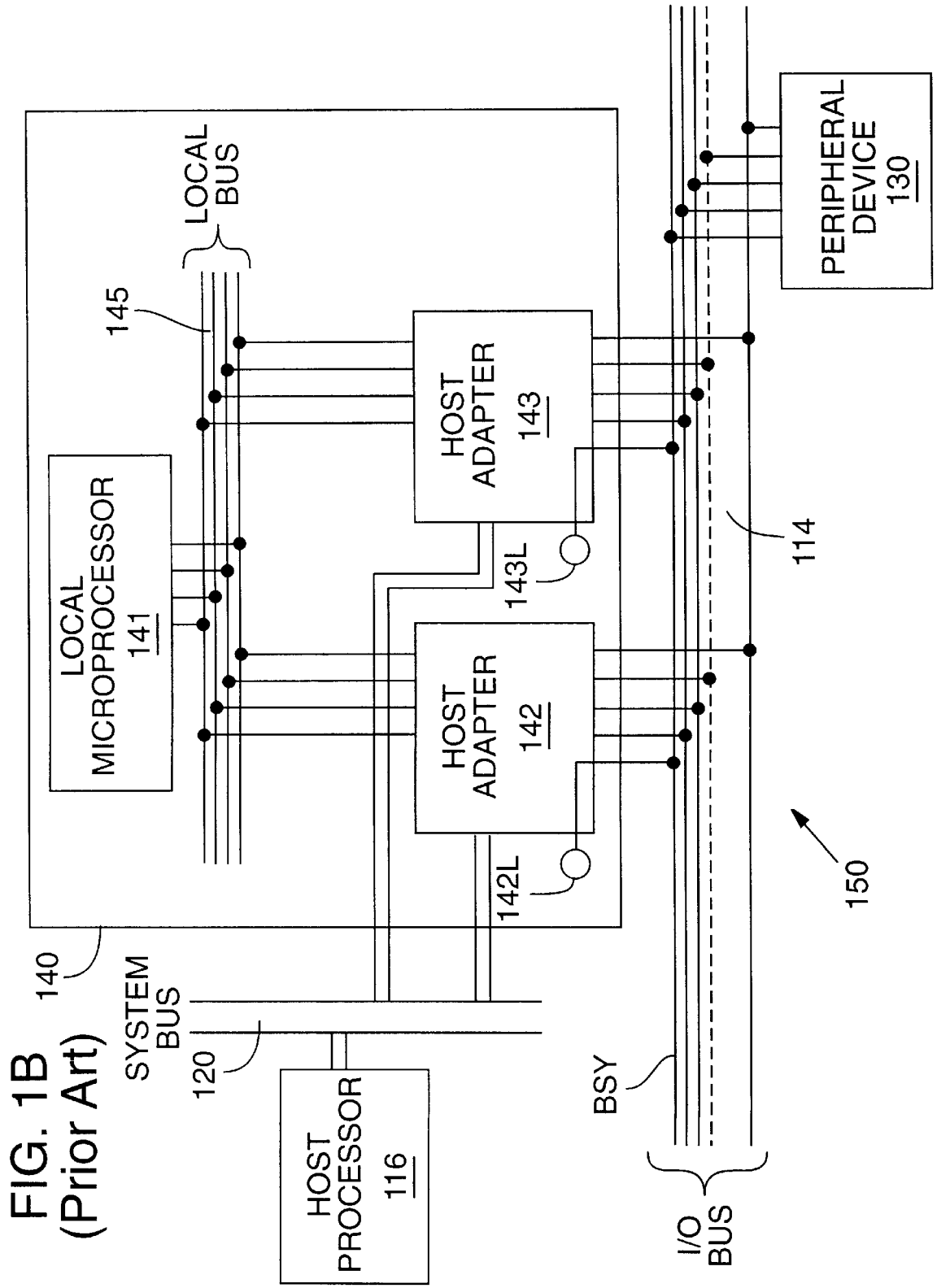
FIG. 1B illustrates another prior art computer system having two host adapter integrated circuits for data transfer between a I/O bus and a system bus or local bus.

According to the principles of this invention, a host adapter integrated circuit 214 (FIG. 2) for interfacing a system bus 250 with a I/O bus 213 includes a status indicator circuit 214I. As explained more completely below, status indicator circuit 214I receives a plurality of input signals 214F, and based upon control signals on lines 214C, and supplies one of input signals on lines 214F as an output signal LED- on a status indicator terminal LED- of host adapter integrated circuit 214. Herein, for convenience, the same reference numeral LED- is used for the status indicator terminal and for the output signal on the status indicator terminal. Therefore, a light emitting diode (LED) 216 indicates in real time one of the input signals on lines 214F that, for example, indicates usage of I/O bus 213.

Furthermore, if a host computer 210 includes a number of host adapter integrated circuits such as host adapter integrated circuit 214, then a LED 216 connected to host adapter integrated circuit 214 is turned on independent of another LED connected to another host adapter integrated circuit because each host adapter integrated circuit includes its own status indicator circuit in accordance with this invention.

In the embodiment illustrated in FIG. 2, host computer 210 includes a host processor 211, that is in this embodiment an Intel 80486 microprocessor, and a memory 212 connected to each other by a system bus 250. System bus 250 is a PCI bus, an ISA bus and an EISA bus in alternative embodiments. Moreover, I/O bus 213 is a SCSI bus in this embodiment and so, first peripheral device 261 and second peripheral device 262 included in computer system 200 are SCSI peripheral devices.

Host adapter integrated circuit 214 has a number of first terminals 214L connected to system bus 250, a number of second terminals 214S connected to I/O bus 213 and status indicator terminal LED- connected to a LED driver circuit 215. LED driver circuit 215 uses output signal LED- from host adapter integrated circuit 214 to turn LED 216 on and off.

Host adapter integrated circuit 214 includes a data transfer circuit 214T that has a plurality of lines connected to first terminals 214L for communication with system bus 250, a plurality of lines connected to second terminals 214S for communication with I/O bus 213. Data transfer circuit 214T supplies a plurality of input signals on lines 214F and a plurality of control signals on lines 214C.

The specific modules and specific configuration of the modules in data transfer circuit 214T are not essential aspects of this invention. However, the modules and configuration of the modules in one embodiment of a data transfer circuit 214T are illustrated in FIG. 3, described briefly below, and are similar or identical to modules described in copending U.S. patent application Ser. No. 07/964,532, entitled "Intelligent SCSI Bus Host Adapter Integrated Circuit" filed by Craig A. Stuber et al. that is hereby incorporated by reference in its entirety.

In the embodiment of FIG. 3, data transfer circuit 214T has a number of modules such as system bus module 314L, reset module 314R, I/O bus module 314S, memory module 314M, IDDAT module 314I and sequencer module 314Q, all connected together by an internal bus 314B. In this embodiment, at least one of the input signals on lines 214F is supplied by system bus module 314S and another one of input signals on lines 214F is supplied by internal bus 314B. Furthermore, at least one of the control signals on lines 214C is also supplied by internal bus 314B. In one embodiment, status indicator circuit 214I can tap any data on internal bus 314B to drive output signal LED-.

FIG. 4 illustrates a signal interface for one embodiment of a status indicator circuit 214I illustrated in FIGS. 2 and 3. In this embodiment, status indicator circuit 214I has five input signals 214F and six control signals 214C. In response to an active power on reset function signal POR-, supplied by reset module 314R to indicate that host adapter integrated circuit 214 is being reset, status indicator circuit 214I drives signal LED- inactive, irrespective of all the other signals on lines 214F and 214C.

When control signal IDDATCLKEN on one of lines 214C from IDDAT module 314I goes active, status indicator circuit 214I supplies input signal IDDATCLK- as signal LED-, irrespective of the states of the other signals on lines 214F and 214C, except for the state of control signal POR- as described above.

When control signal S1F_WR, a write strobe for address 1F, goes active, status indicator circuit 214I saves signals D5, D6 and D7, that correspond to the three most significant bits of a write data bus included in internal bus 314B (FIG. 3). When control signal S1F_RD, a read strobe for address 1F, goes active, status indicator circuit 214I writes the saved signals to the three most significant bits of a read data bus included in internal bus 314B.

When control signal D5 is active, status indicator circuit 214I supplies a master/slave signal, obtained by combining input signals MASTERACT and SLAVEACT, as output signal LED-, if control signals POR- and IDDATCLKEN are inactive, irrespective of the state of control signal D7.

When control signal D7 is active, status indicator circuit 214I supplies input signal D6 as signal LED- if control signals D5, IDDATCLKEN and POR- are inactive. Input signals MASTERACT and SLAVEACT are signals from system bus module 314L, which when active indicate whether host adapter integrated circuit 314 has a master status or a slave status respectively with respect to system bus 250, as described more completely below.

If all control signals POR-, IDDATCLKEN, D5, D7 and S1F_WR are inactive, status indicator circuit 214I supplies input signal DEVSCSIBSY as output signal LED-. Input signal DEVSCSIBSY, generated by I/O bus module 314S, goes active when I/O bus module 314S communicates with I/O bus 213, and otherwise remains inactive.

Figure 5A:
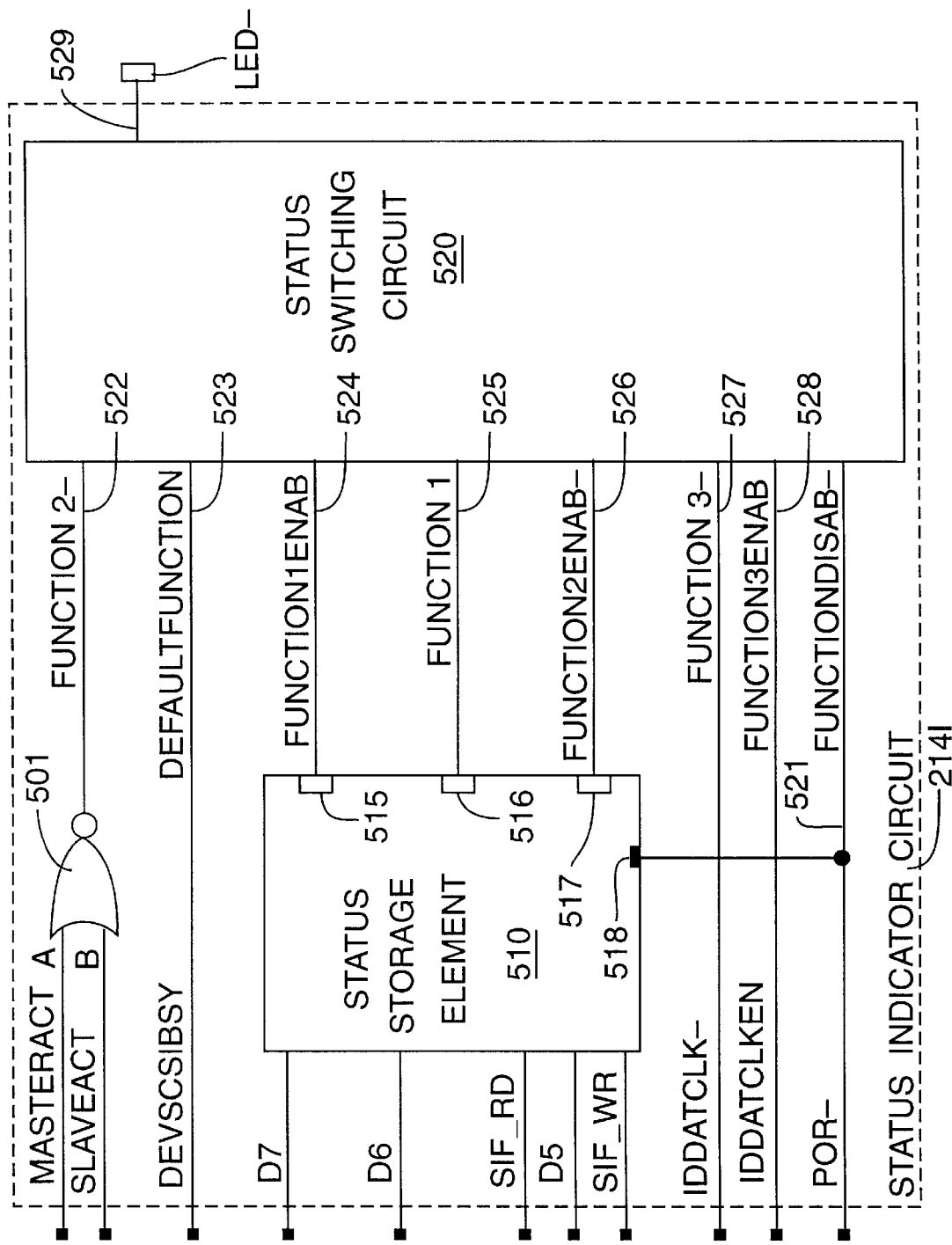
FIG. 5A illustrates a low level block diagram of one embodiment of a status indicator circuit of FIG. 4.

FIG. 5A illustrates a low level block diagram of one embodiment of status indicator circuit 214I of FIG. 4. Status indicator circuit 214I includes a status storage element 510 and a status switching circuit 520. Status storage element 510 has data input lines D5, D6, D7, address strobe line S1F_WR, a reset input terminal 518 and a number of output terminals 515, 516 and 517. Herein, for convenience, the same reference numerals D5, D6, D7 and S1F_WR are used for the lines and for the signals on the lines. As noted above, lines D5, D6 and D7 carry the three most significant bits of a write data bus included in internal bus 314B (FIG. 3).

In response to an active signal on address strobe line S1F_WR, status storage element 510 latches input signals D5, D6 and D7 and generates signals FUNCTION2ENAB-, FUNCTION1 and FUNCTION1ENAB on output terminals 517, 516, and 515 respectively. When signal POR- on reset input terminal 518 goes active, status storage element 510 drives signals FUNCTION1ENAB, and FUNCTION1 active, and signal FUNCTION2ENAB- inactive.

Status switching circuit 520 has a number of lines. A first function input line 525 is connected to output terminal 516. A first function enable line 524 corresponds to first function input line 525 and is, in this embodiment, connected to output terminal 515. A second function input line 522 carries a signal FUNCTION2- that in this embodiment is the signal MASTERACT/SLAVEACT from NOR gate 501. A second function enable line 526 corresponds to second function input line 522 and is in this embodiment, connected to output terminal 517. A third function input line 527 carries signal FUNCTION3- that in this embodiment is the signal IDDATCLK-. A third function enable line 528 corresponds to third function input line 527 and carries a signal FUNCTION3ENAB that, in this embodiment, is the control signal IDDATCLKEN. A function disable line 521 carries signal FUNCTIONDISAB- that, in this embodiment, is the control signal POR-. A default function input line 523 carries signal DEFAULTFUNCTION that is input signal DEVSC-SIBSY in this embodiment. An output line 529 is connected to status indicator terminal LED-.

Status switching circuit 520 selectively couples and decouples output line 529 to one of function input lines 525, 522 and 527 in response to an active signal on one of the respective corresponding function enable lines 524, 526 and 528. Status switching circuit 520 prioritizes connection of function input lines to output line 529 in the following order: third function input line 527, second function input line 522 and first function input line 525.

Specifically, in response to an active signal on function disable line 521, status switching circuit 520 drives the signal on output line 529 inactive, irrespective of the signals on first function enable line 524, second function enable line 526 and third function enable line 528.

In response to an active signal on third function enable line 528, status switching circuit 520 connects third function input line 527 to output line 529, irrespective of the signals on first function enable line 524 and second function enable line 526, if the signal on function disable line 521 is inactive.

In response to an active signal on second function enable line 526, status switching circuit 520 couples second function input line 522 to output line 529, irrespective of the signal on first function enable line 524, if the signals on third function enable line 528 and function disable line 521 are inactive.

In response to an active signal on first function enable line 524, status switching circuit 520 couples first function input line 525 to output line 529, only if second function enable line 526, third function enable line 528 and function disable line 521 carry inactive signals.

When each of the function enable lines 524, 526 528 and function disable line 521 have inactive signals, status switching circuit 520 couples output line 529 to default function input line 523.

Therefore, a LED coupled to status indicator terminal LED- indicates the status of any portion of host adapter integrated circuit 214, that is connected by one of function input lines 525, 522, 527 and 523 and status switching circuit 520 to status indicator terminal LED-.

Figure 5B:
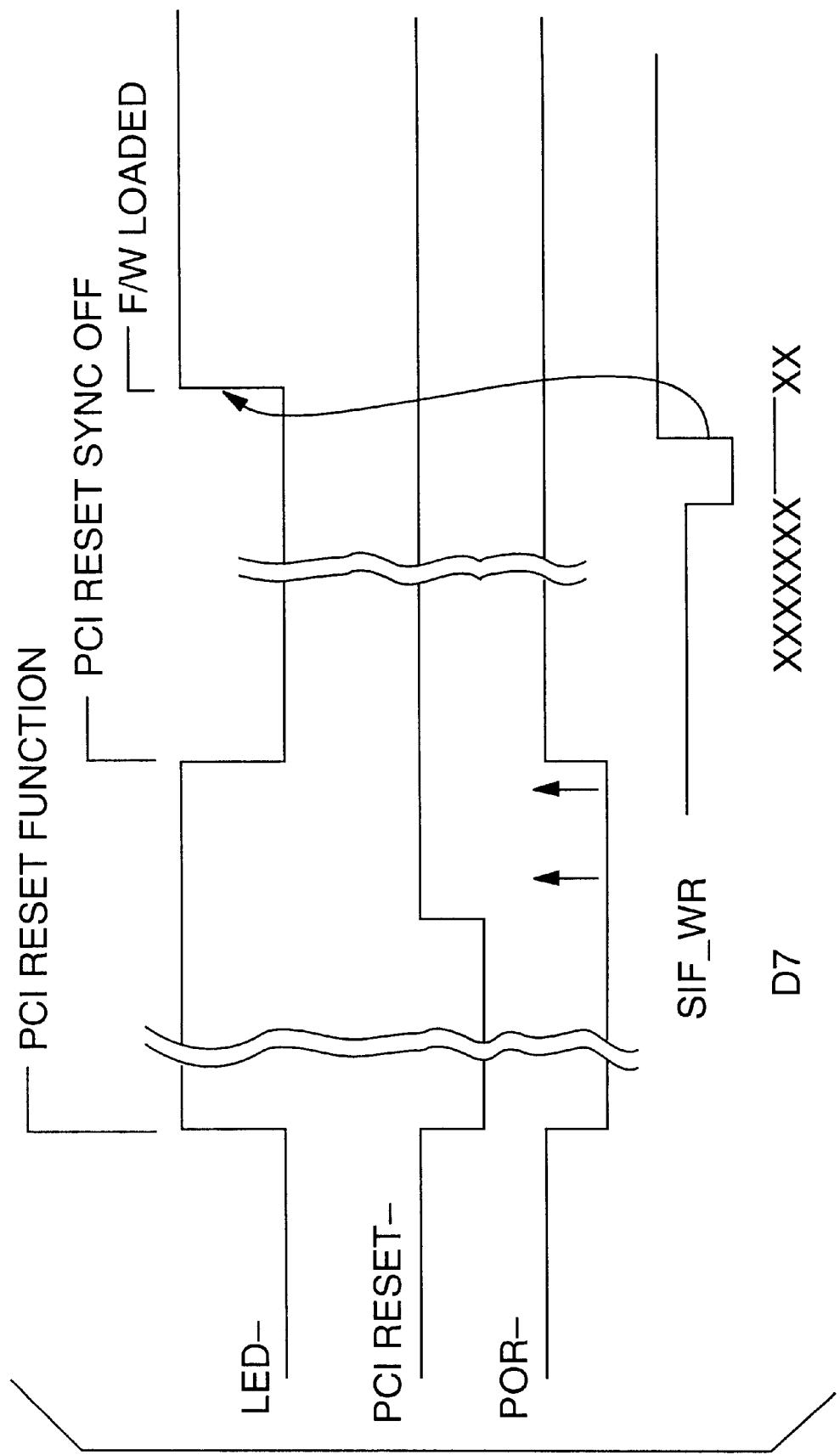
FIG. 5B illustrates signal LED- shortly after assertion of a signal PCIRESET- in one embodiment of a host adapter integrated circuit in accordance with this invention.

FIG. 5B illustrates signal LED- when system bus 250 (FIG. 3), that is a PCI bus in this embodiment, is reset. Assertion of signal PCIRESET- causes signal POR- to go active and signal LED- to float for the duration of assertion of signal PCIRESET-. Subsequently, even after signal PCIRESET- is deasserted, signal POR- stays active and signal LED- stays floated for synchronization to avoid metastable conditions. After signal PCIRESET- has been synchronized, host adapter integrated circuit 214 loads device identification data from a pin IDDAT, followed by load of firmware. Then host adapter integrated circuit 214 drives signal S1F_WR active and also drives signal D7 inactive and drives signal LED- high thus turning off an indicator such, as light emitter diode (LED) 640A.

The operations of host adapter integrated circuit 214 are described below in relation to the associated circuitry for several embodiments of status indicator circuit 214I illustrated in FIGS. 6A–6H. Like reference numerals are used in FIGS. 6A–6H to refer to elements which are similar, but not necessarily identical, i.e., suffixes "A"–"H" differentiate between the reference numerals of FIGS. 6A–6H.

Figure 6A:
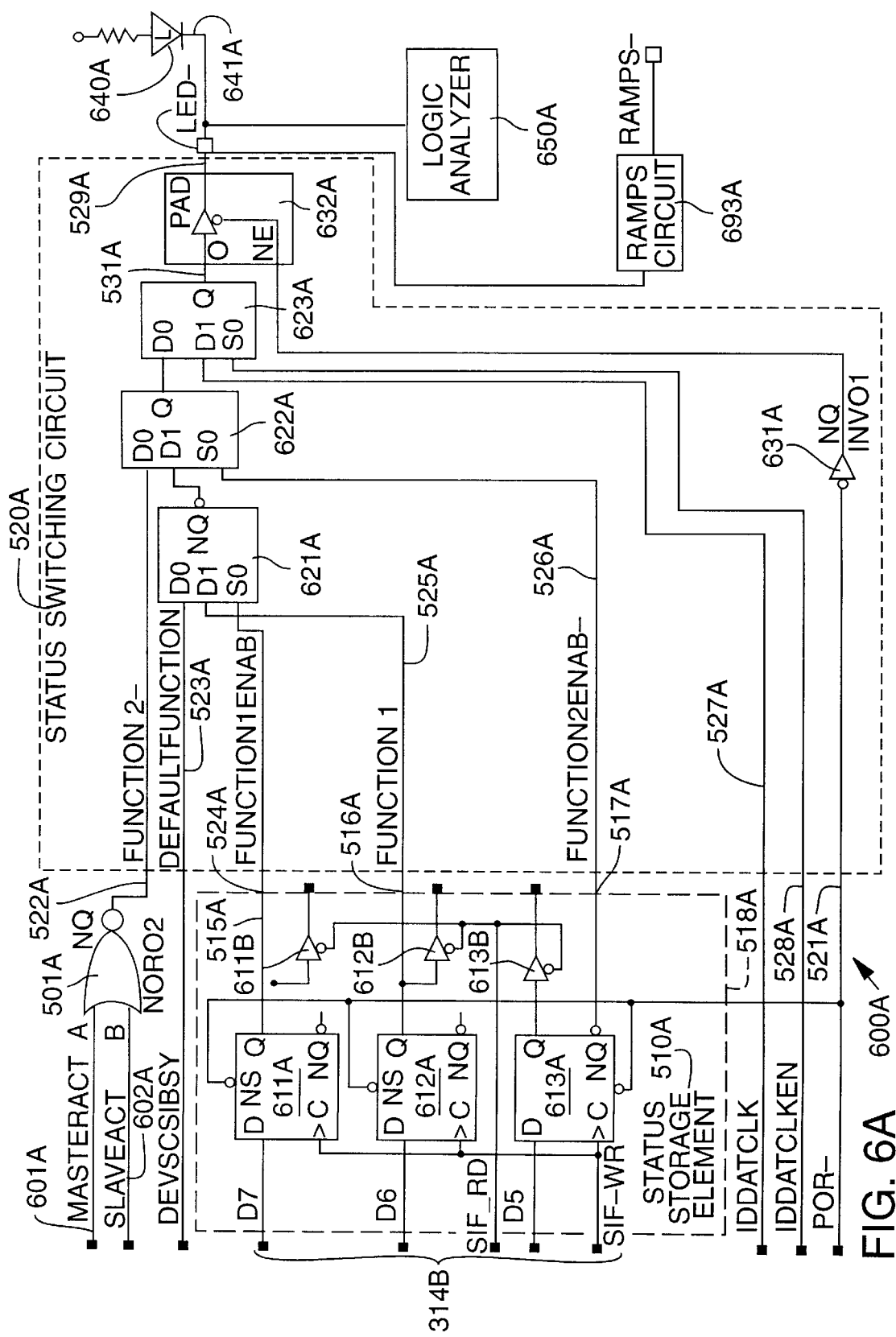

FIG. 6A illustrates one embodiment of status indicator circuit 214I that indicates status one of five different functions of host adapter integrated circuit 214 as described below. In this embodiment, status storage element 510A (FIG. 6A) is a register having a first enable bit, a first input bit and a second enable bit, that are connected respectively to output terminals 515A, 516A and 517A and so to first function enable line 524A, first function input line 525A and second function enable line 526A.

In the embodiment of FIG. 6A, the first enable bit, first input bit and second enable bit of status storage element 510A are implemented by three D-type flip-flops 611A, 612A and 613A. Flip-flop 611A loads signal D7 on input terminal D on output terminal Q, that is connected to first function enable line 524A of status switching circuit 420, in response to a rising edge of signal S1F_WR. Flip-flop 612A loads signal D6 on input terminal D on output terminal Q, that is connected to first function input line 525A, in response to a rising edge of signal S1F_WR. Flip-flop 613A loads the compliment of signal D5 on input terminal D on output terminal NQ, that is connected to second function enable line 526A, in response to a rising edge of signal S1F_WR.

In this embodiment, output terminals Q of flip-flops 611A, 612A and 613A are also coupled to three tristate output buffers 611B, 612B and 613B (FIG. 6A) that are in turn coupled to three bits of a read data bus included in internal bus 314B. Host adapter integrated circuit 214 in this embodiment can read bits D5, D6 and D7 and write bits D5, D6 and D7 in a single operation by driving signal S1F_WR active and subsequently driving a signal S1F_RD active.

In response to an active power-on reset signal POR-, status storage element 510 holds flip-flops 611A and 612A set and flip-flop 613A reset so that the corresponding signals on first function enable line 524A and first function input line 525A are active, and second function enable line 526A is inactive.

In this embodiment, status switching circuit 520A is implemented by three two-to-one multiplexers 621A, 622A, 623A and a tri-state output buffer 632A. Multiplexer 621A has an inverting output and multiplexers 622A and 623A have noninverting outputs. Multiplexer 621A passes signal DEVSCSIBSY, on input terminal D0, to output terminal NQ, that is connected to input terminal D1 of multiplexer 622A, when signal FUNCTION1ENAB on input terminal S0 is inactive, e.g., low. Alternatively multiplexer 621A passes signal FUNCTION1 on input terminal D1 to output terminal NQ, when signal FUNCTION1ENAB is active, e.g., high.

Multiplexer 622A passes a signal FUNCTION2- on input terminal D0 to output terminal Q, that is connected to input terminal D0 of multiplexer 623A, when signal FUNCTION2ENAB- on input terminal S0 is active, e.g., low. Alternatively multiplexer 622A passes the signal from output terminal NQ of multiplexer 621A to output terminal Q, when signal FUNCTION2ENAB is inactive, e.g., high.

Multiplexer 623A passes a signal on input terminal D0 to output terminal Q, that is connected to signal line 531A. Signal line 531A is in turn connected to input line D of tri-state output buffer 632A, when signal IDDATCLKEN, on input terminal S0, is inactive, e.g., low. Alternatively multiplexer 623A passes signal IDDATCLK-, on input terminal D1, to signal line 531A and thus to input line D of tri-state output buffer 632A, when signal IDDATCLKEN is active, e.g., high.

Status switching circuit 520A includes an inverter 631A that receives signal POR- on function disable line 521A and supplies the inverse of signal POR- to the control signal input line NE of tri-state output buffer 632A. Therefore, an active signal POR- e.g., low, sets flip-flops 611A and 612A and resets flip-flop 613A, thereby causing an active signal to appear on input line D of tri-state output buffer 632A, if the signal IDDATCLKEN is inactive. However, the high signal at the control signal input line NE of tri-state output buffer 632A causes tri-state output buffer 632A to float its output line 529A and therefore signal LED- on status indicator terminal LED- is pulled high by the power source for LED 640A.

When signal POR- becomes inactive, NQ output of inverter 631A, which is coupled to NE input of tri-state output buffer 632A, goes low. Thus inactive signal POR- enables the active signal from signal line 531A at input line D of tristate output buffer 632A to drive signal LED- on output line 529A active e.g., low. Therefore, the duration during which signal LED- is inactive indicates the time needed to reset host adapter integrated circuit 214.

In one embodiment, power-on reset signal POR- is asserted when the signal PCIRESET- from PCI bus 250 is asserted. However, signal PCIRESET- may terminate asynchronously and thus cause a metastable problem. Therefore, reset module 314R (FIG. 3) in host adapter integrated circuit 214 extends the duration of assertion of signal POR- to equal two clock cycles to avoid metastable conditions. Hence signal LED- is normally driven low after two clock cycles. So, a measured reset duration on status indicator terminal LED- of two clock cycles, indicates that reset module 314R has successfully synchronized signal PCIRESET-. Alternatively a measured reset duration greater than two clock cycles, indicates a failure in reset module 314R, for example in one of the flip-flops used to extend signal POR- to two clock cycles or in a circuit preceding LED driver circuit 215.

If some defect in host adapter integrated circuit 214 prevents the firmware from loading successfully, signal LED- remains active well beyond the expected clock cycles to load firmware. During normal firmware load, the duration for which signal LED- is active indicates the amount of time required for firmware to be loaded into host adapter 214.

When signal IDDATCLKEN goes active, status indicator circuit 600A supplies signal IDDATCLK- on third function input line 527A as signal LED-. When signal IDDATCLKEN goes inactive, status indicator circuit 600A supplies the inverse of signal DEVSCSIBSY as signal LED-, as described below, if status storage element 510 has not been reset, and otherwise supplies one of the other signals such as signal FUNCTION1 and FUNCTION2-, as signal LED-.

The function implemented by signals IDDATCLKEN and IDDATCLK- is not an essential aspect of this invention. However, the function implemented in one embodiment, described briefly below, is similar or identical to the function described in copending, commonly filed, and commonly assigned U.S. patent application Ser. No. 08/xxx,xxx, Attorney Docket No. M-2717 entitled "Method And Apparatus For Automatically Loading Configuration Data On Reset Into A Host Adapter Integrated Circuit" of Stillman Gates and Paresh Borkar on Sep. 7, 1994 that is hereby incorporated by reference in its entirety.

In one embodiment, signal IDDATCLKEN, driven by IDDAT module 314I, (FIG. 3) indicates that a user specified device identification number is to be loaded from a pin IDDAT (FIG. 6H) of host adapter integrated circuit 214 to replace a power-on reset default value of the device identification number. An external device (not shown), that holds the user specified device identification number, drives a signal on pin IDDAT, in response to signal LED-, that is identical to signal IDDATCLK- when signal IDDATCLKEN is active. Signal IDDATCLK- cycles low and high a predetermined number of times, e.g., eight times, causing signal LED- to go low and high eight times also. Transitions in signal LED- are used by the external device to present a new shifted value of the user specified device identification number to pin IDDAT, on each positive edge of signal LED-.

In this manner, IDDAT module 314I uses status indicator terminal LED- to clock in one byte of device identification data from pin IDDAT. However, a different module can use status indicator terminal LED- to perform a different function, as long as the function to be performed has priority over all other functions, except for the power-on reset function described above.

After firmware is loaded successfully and a device identification number has been replaced as necessary, sequencer 314Q executes a write statement to address 1F, the address of status storage element 510A, to set input signals D5, D6 and D7 to 0, so that status storage element 510A drives signals FUNCTION1ENAB, FUNCTION1 inactive, e.g. low, and signal FUNCTION2ENAB- also inactive, e.g. high. In response, status switching circuit 520A supplies the inverse of signal DEVSCSIBSY on default function input line 523A as signal LED-. At this time, host adapter integrated circuit 214 is being configured and signal DEVSC-SIBSY is inactive because host adapter integrated circuit 214 is not ready to support SCSI bus operations on the I/O bus.

From this point on, signal LED- goes active whenever host adapter integrated circuit 214 communicates with I/O bus 213 and goes inactive otherwise. Therefore, signal LED- provides a real time indication of the usage of I/O bus 213 by host adapter integrated circuit 214. As signal DEVSC-SIBSY is generated inside host adapter integrated circuit 214, signal LED- remains inactive, thus independent of I/O Bus activity that is unrelated to the specific host adapter integrated circuit 214 that supplies signal DEVSCSIBSY.

Therefore, in a host computer that includes multiple host adapter integrated circuits 214, only the LED connected to a host adapter integrated circuit 214 that is currently communicating with I/O bus 213 is turned on at any given time. When more than one host adapter integrated circuit 214 are simultaneously communicating with the I/O bus 213, each host adapter integrated circuit 214 has the respective LED- signal active. For example, when two host adapter integrated circuits 214 communicate with each other, both host adapter integrated circuits 214 have the respective signals LED- active.

Address 1F of status storage element 510A is within the address space of sequencer module 314Q in host adapter integrated circuit 214, and also within the address space of any device connected to system bus 250, such as microprocessor 211. To indicate that a predetermined path in software has been entered, the user merely inserts a statement to write to address 1F to configure signals D7, D6 and D5 of the write data bus included in internal bus 314B. Hence a program being executed by either sequencer 314Q or by microprocessor 211 can be monitored for debugging or performance measurement by inserting statements to alternately write 1, 1, 0 and 1, 0, 0 on data lines D7, D6 and D5 respectively. This sequence of signals causes status indicator circuit 600A to supply the alternately active and inactive signal D6 as signal LED-.

Moreover, either sequencer 314Q or microprocessor 211 can read bits D7, D6 and D5 and so, debugging or performance measurement can be performed by either sequencer 314Q or microprocessor 211. Such a read-back capability provides efficiency and precision because the processor doing debugging or performance measurement does not need to maintain a copy of bits D7, D6 and D5.

Therefore, statements inserted into any software or firmware that needs to be debugged or monitored can drive signal LED- active and inactive. Changes in the state of signal LED- are counted to determine the number of times a certain path in the software or firmware containing the write statement has been executed. Moreover, write statements inserted at the beginning and end of an idle loop to set and clear bit D6 are used to measure the duration of time spent within the idle loop and thus assesses the performance of software or firmware.

In one embodiment, signal LED- is pulsed once to indicate passage through a first set of software or firmware instructions, twice for a second set of software or firmware instructions and three times for a third set of software or firmware instructions, to allow the user to trace the flow of logic between the first, second and third instruction sets.

When bit D5 is set, status storage element 510A drives signal FUNCTION2ENAB- active. In response to an active signal FUNCTION2ENAB-, status switching circuit 520A supplies signal FUNCTION2- on second function input line 522A as signal LED- on status indicator terminal LED-. Signal FUNCTION2- is formed by NOR gate 501A which combines signals MASTERACT and SLAVEACT. Therefore, an active LED- signal indicates that host adapter integrated circuit 214 is an active master on system bus 250 or is a responding target of a transaction on system bus 250.

Figure 6B:
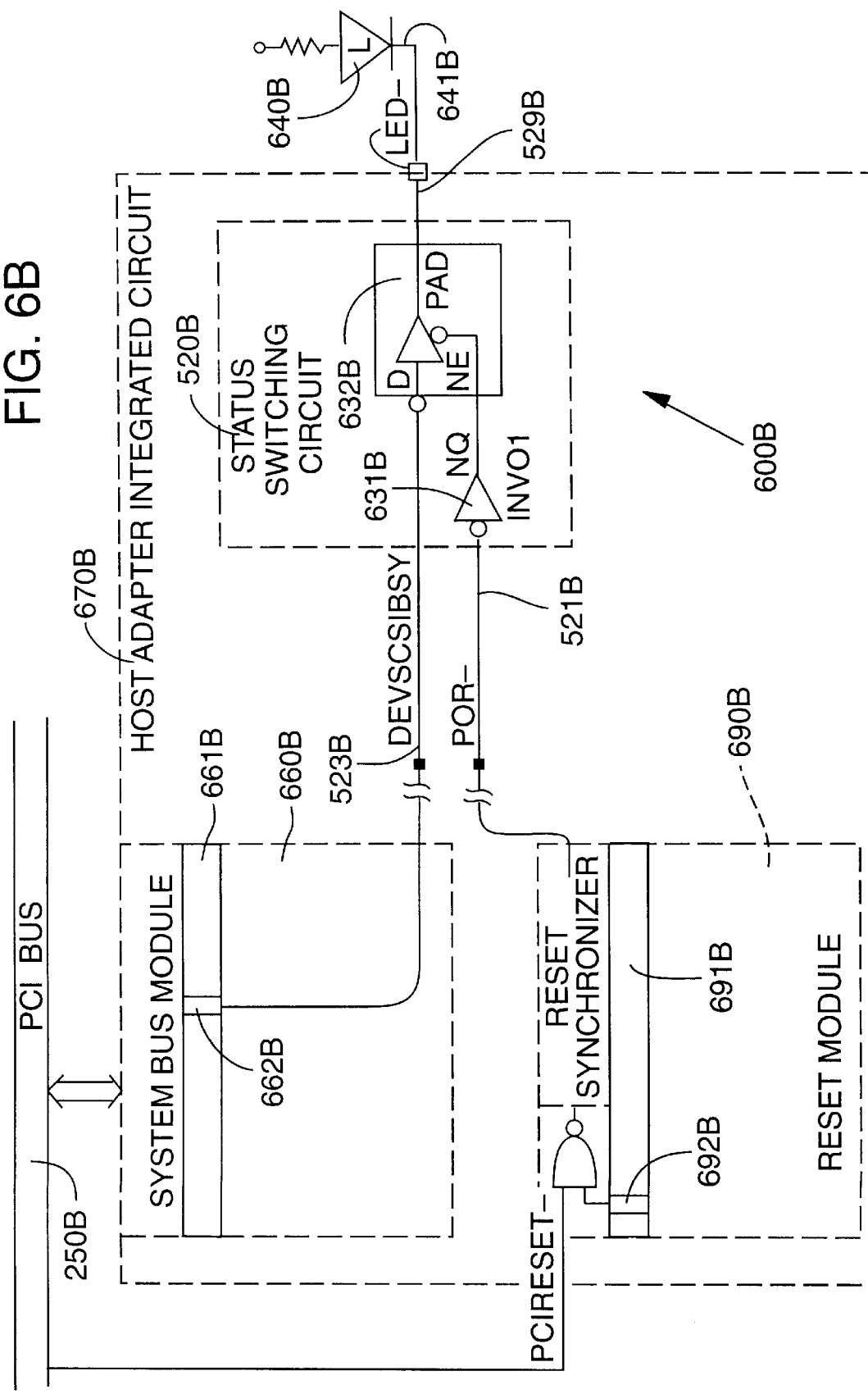

FIG. 6B illustrates another embodiment of a status indicator circuit 600B included in a host adapter integrated circuit 670B in accordance with this invention. The operation of status indicator circuit 600B is similar to the operation of status indicator circuit 600A discussed above, except that status switching circuit 520B has only a default function input line 523B and a function disable line 521B.

System bus module 660B sets and clears bit 662B in register 661B depending on whether system bus 350B is being used by host adapter integrated circuit 670B. Circuitry (not shown) of host adapter integrated circuit 670B drives input signal DEVSCSIBSY based on the value of bit 662B. In this embodiment, status switching circuit 520B includes an inverting tri-state output buffer 632B that supplies the inverse of signal DEVSCSIBSY as signal LED-, when control signal POR- is inactive.

Moreover in this embodiment, reset module 690B has a chip reset bit 692B in host control register HCNTRL. When chip reset bit 692B is set, an input terminal of NOR gate 693B is driven high which in turn drives signal POR- active, e.g., low. Furthermore, when host processor 211 drives a reset signal on system bus 250B active, another input terminal of NOR gate 693B goes low, which also drives control signal POR- active. The response of status switching circuit 520B to an active signal POR- on function disable line 521B is identical to that described above in reference to function disable line 521A of FIG. 6A.

Figure 6C:
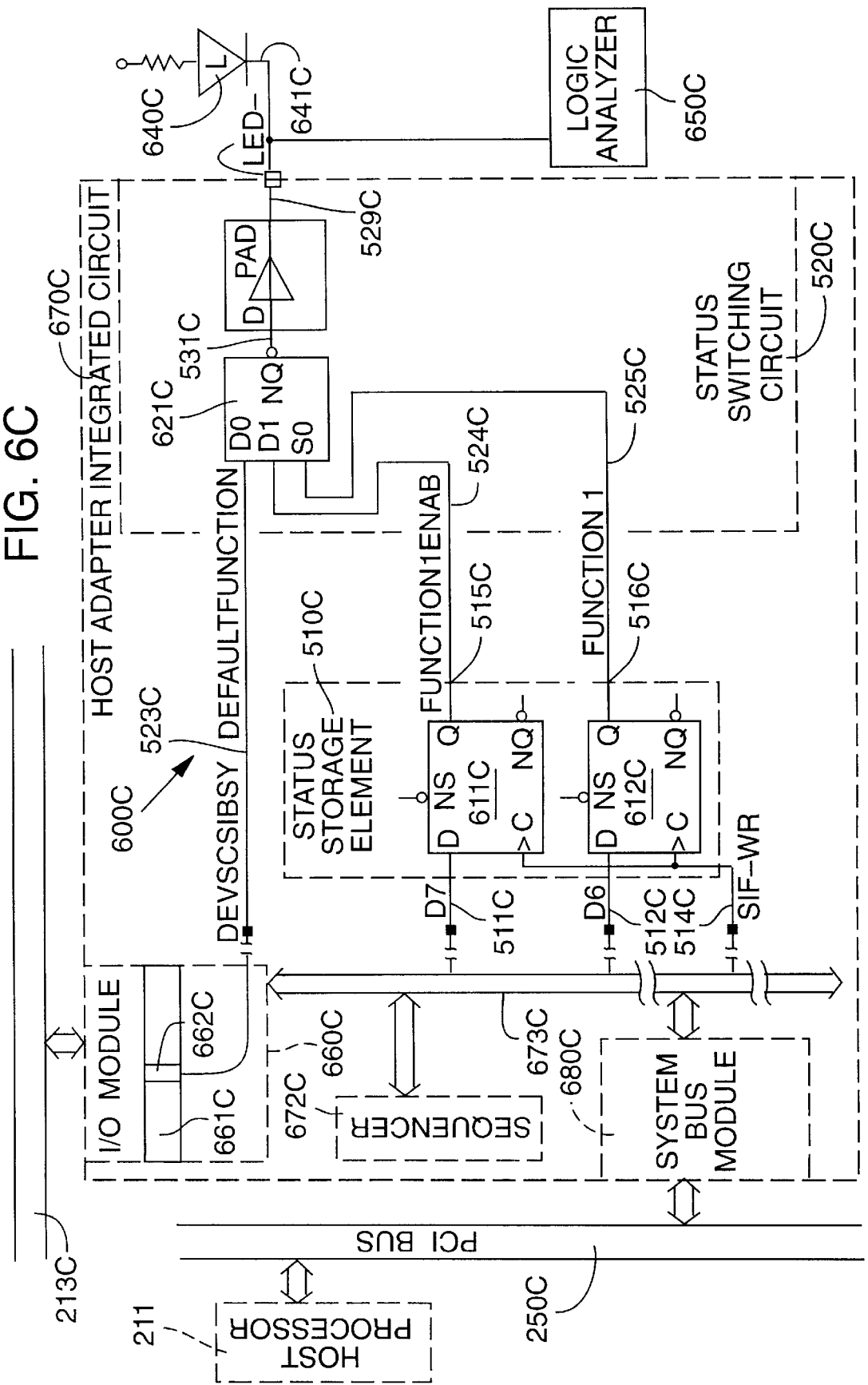

FIG. 6C illustrates another embodiment of a status indicator circuit 600C included in a host adapter integrated circuit 670C in accordance with this invention. The operation of status indicator circuit 600C is similar to the operation of status indicator circuit 600A described above, except that status switching circuit 520C has only first function input line 525C, first function enable line 524C and default function input line 523C.

In this embodiment, sequencer 672C drives input signal D6 and control signals D7 and S1F_WR supplied to status storage element 510C via internal bus 314B, whenever a statement writes to address 1F. Moreover, in this embodiment, host processor 211 can also drive input signal D6 and control signals D7 and S1F_WR via system bus 250C, system bus module 680C and internal bus 673C, whenever host processor 211 owns system bus 250C and whenever a statement writes to address 1F. Output signal LED- drives a logic analyzer 650C, used for debugging and performance measurement.

Figure 6D:
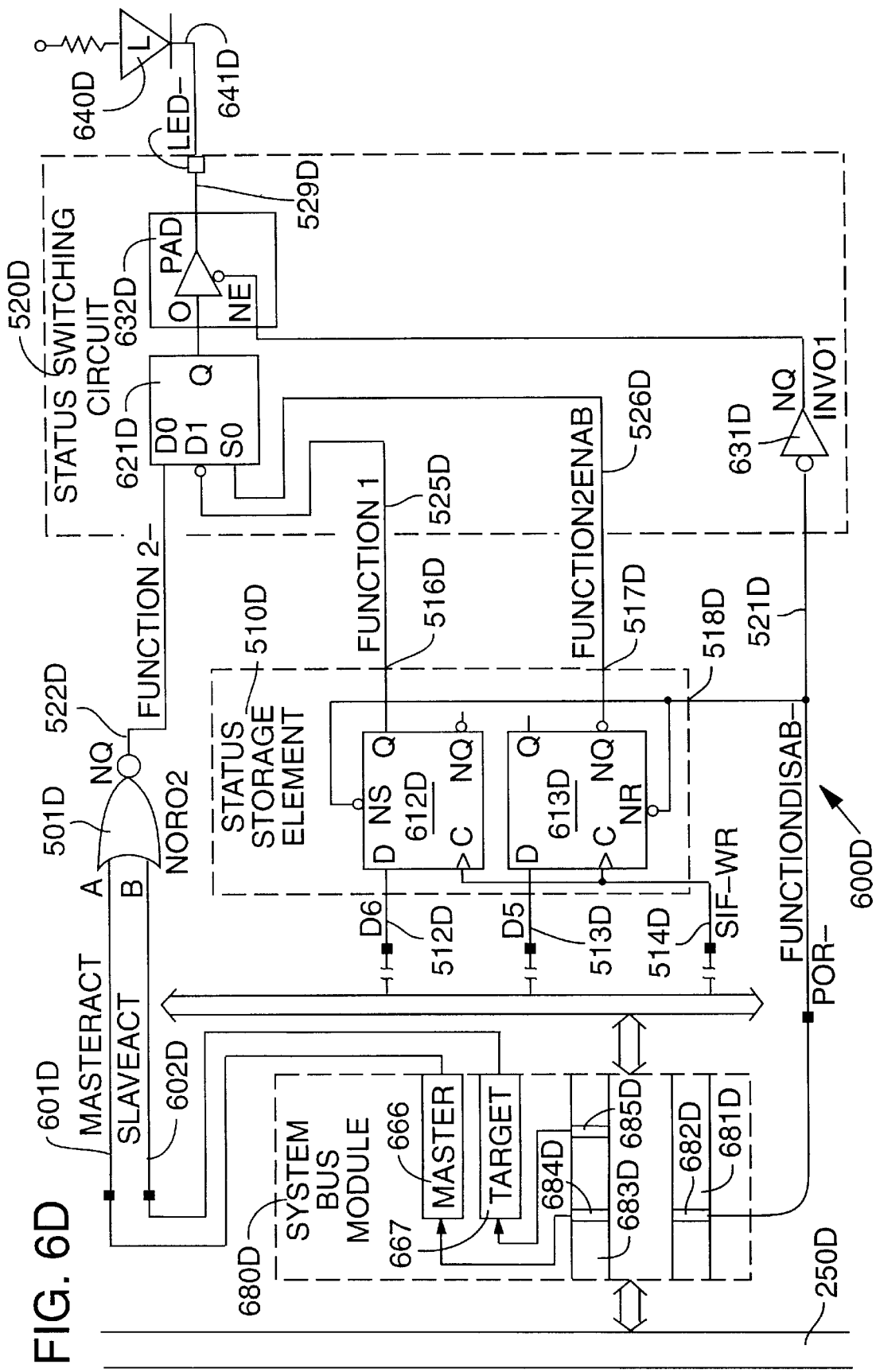

FIG. 6D illustrates another embodiment of a status indicator circuit 600D in accordance with this invention. Status indicator circuit 600D is similar to status indicator circuit 600A described above except that status switching circuit 520D has only first function input line 525D, second function input line 522D, second function enable line 526D and function disable line 521D.

Status switching circuit 520D includes a multiplexer 622D, an inverter 631D and a tri-state output buffer 632D. Multiplexer 622D has a non-inverting input terminal D0 that is driven by signal FUNCTION2- on second function input line 522D and an inverting input terminal D1 that is driven by signal FUNCTION1 on first function input line 525D. Status switching circuit 520D alternatively connects output line 529D to first function input line 525D and second function input line 522D in response to inactive and active signals respectively on second function enable line 526D, while function disable line 521D has an inactive signal. The response of status switching circuit 520D to an active signal on function disable line 521D is identical to that described above in reference to function disable line 521A of FIG. 6A.

Master section 666 of system bus module 680D is coupled to a system bus status register 683D containing a master enable bit 684D and a target enable bit 685D. When master enable bit 684D is active, master section 666 of system bus module 680D can perform master transactions on system bus 250D. When target enable bit 685D is active, target section 667 of system bus module 680D can perform slave transactions on system bus 250D. Circuitry (not shown) of host adapter integrated circuit 214 drives signals MASTERACT and SLAVEACT active when master or slave transactions are respectively performed.

System bus module 680D drives signal MASTERACT active whenever system bus module 680D receives a grant after requesting the system bus, thereby indicating that the system bus 250D belongs to host adapter integrated circuit 214. Whenever master section 666 of system bus module 680D finishes using system bus 250D, master section 666 of system bus module 680D drives signal MASTERACT inactive.

Whenever target section 667 of system bus module 680D finds that an address on system bus 250D fits in the address space managed by system bus module 680D and if target enable bit 685D is active, target section 667 of system bus module 680D drives signal SLAVEACT active and then responds to the signal on system bus 250D. Whenever target section 667 of system bus module 680D completes responding to signals on system bus 250D, target section 667 of system bus module 680D drives signal SLAVEACT inactive.

Figure 6E:
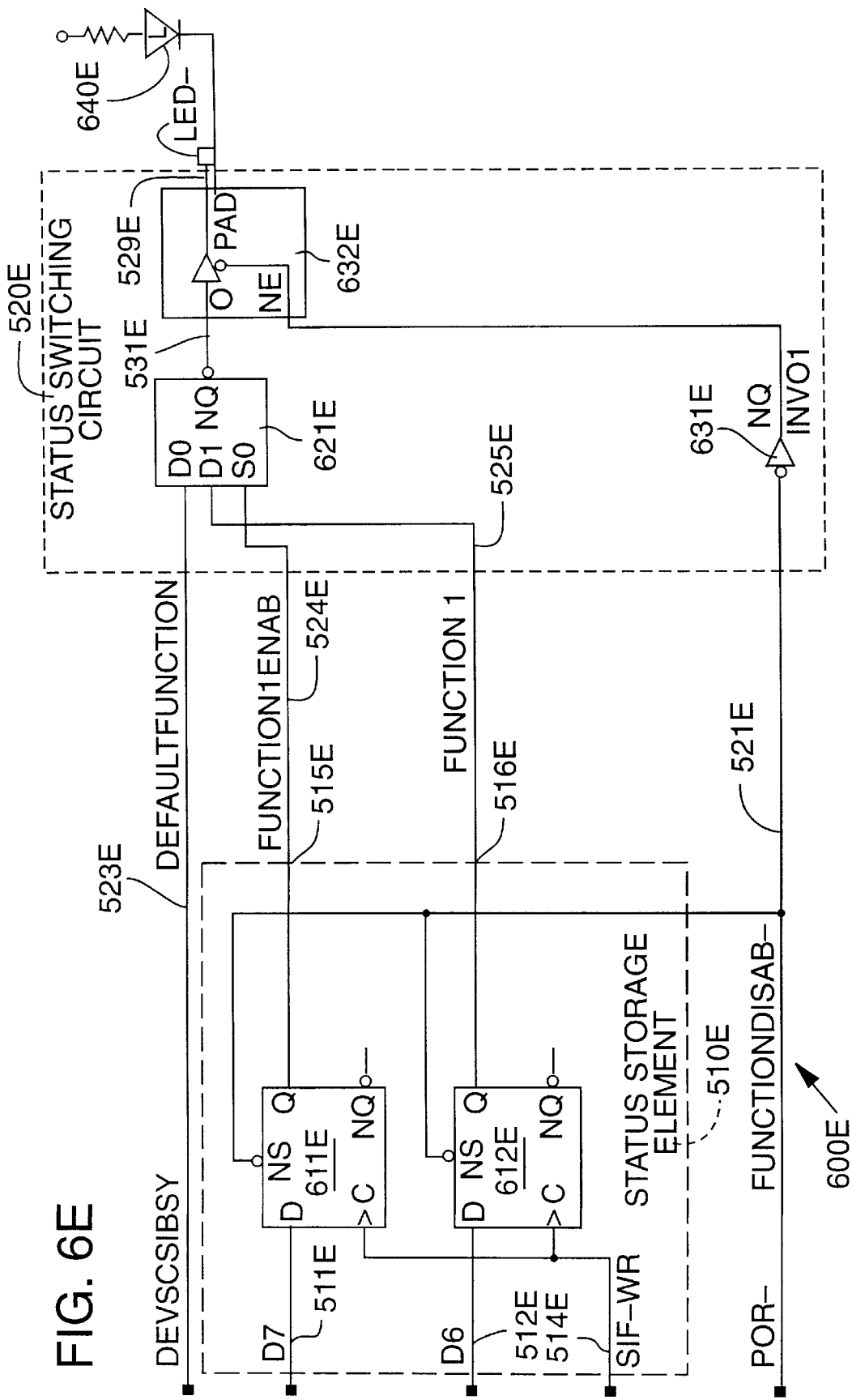

FIG. 6E illustrates another embodiment of a status indicator circuit 600E in accordance with this invention. Status indicator circuit 600E is similar to status indicator circuit 600A described above except that status switching circuit 520E has only a first function input line 525E, a first function enable line 524E, a default function input line 523E and a function disable line 521E. Status switching circuit 520E is implemented by multiplexer 621E, inverter 631E and tri-state output buffer 632E.

Status indicator circuit 600E supplies an alternatively active and inactive signal D6 as signal LED- when data line D7 has an active signal as described above in reference to status storage element 510A of FIG. 6A. Alternatively, when data line D7 has a low signal, status indicator circuit 600E supplies signal DEVSCSIBSY as signal LED- as described above in reference to default function input line 523A of FIG. 6A. The response of status switching circuit 520E to an active signal POR- on function disable line 521E is identical to that described above in reference to function disable line 521A of FIG. 6A.

Figure 6F:
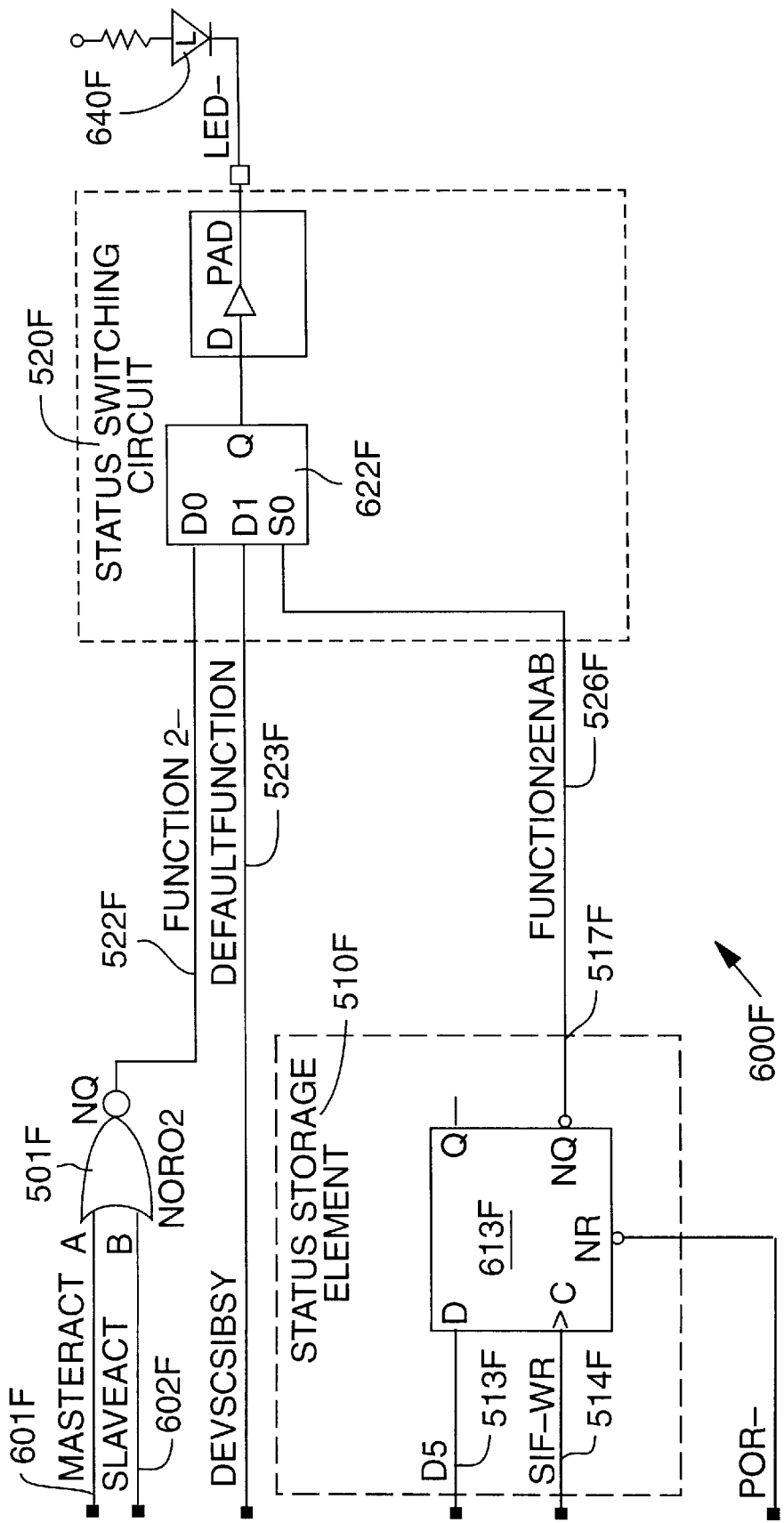

FIG. 6F illustrates one embodiment of a status indicator circuit 600F in accordance with this invention. Status indicator circuit 600F is similar to status indicator circuit 600A described above except that status switching circuit 520F has only a second function input line 522F, a second function enable line 526F and a default function input line 523F, and is implemented by multiplexer 622F. Multiplexer 622F has a non-inverting input terminal D0 that is driven by signal FUNCTION2- and an inverting input terminal D1, that is driven by signal DEVSCSIBSY.

Status indicator circuit 600F supplies signal DEVSCSIBSY as signal LED- when signal D5 is low as described above in reference to default function input line 523A in FIG. 6A. Alternatively, status indicator circuit 600F supplies signal FUNCTION2 on second function input line 522F as signal LED- as described above in reference to second function input line 522A of FIG. 6A.

FIG. 6G illustrates another embodiment of a status indicator circuit 600G in accordance with this invention. Status indicator circuit 600G is similar to status indicator circuit 600A described above except that status switching circuit 520G has only the second function input line 522G, second function enable line 526G, default function input line 523G and function disable line 521G. Status switching circuit 520G is implemented by multiplexer 622G, inverter 631G and tri-state output buffer 632G. Multiplexer 622G has a non-inverting input terminal D0 that is driven by signal FUNCTION2- and an inverting input terminal D1 that is driven by signal DEVSCSIBSY.

Status indicator circuit 600G functions in a manner similar to status indicator circuit 600F except that status indicator circuit 600G is also responsive to an active signal FUNCTIONDISAB- in a manner identical to that described above in reference to tri-state output buffer 632A of FIG. 6A.

Figure 6H:
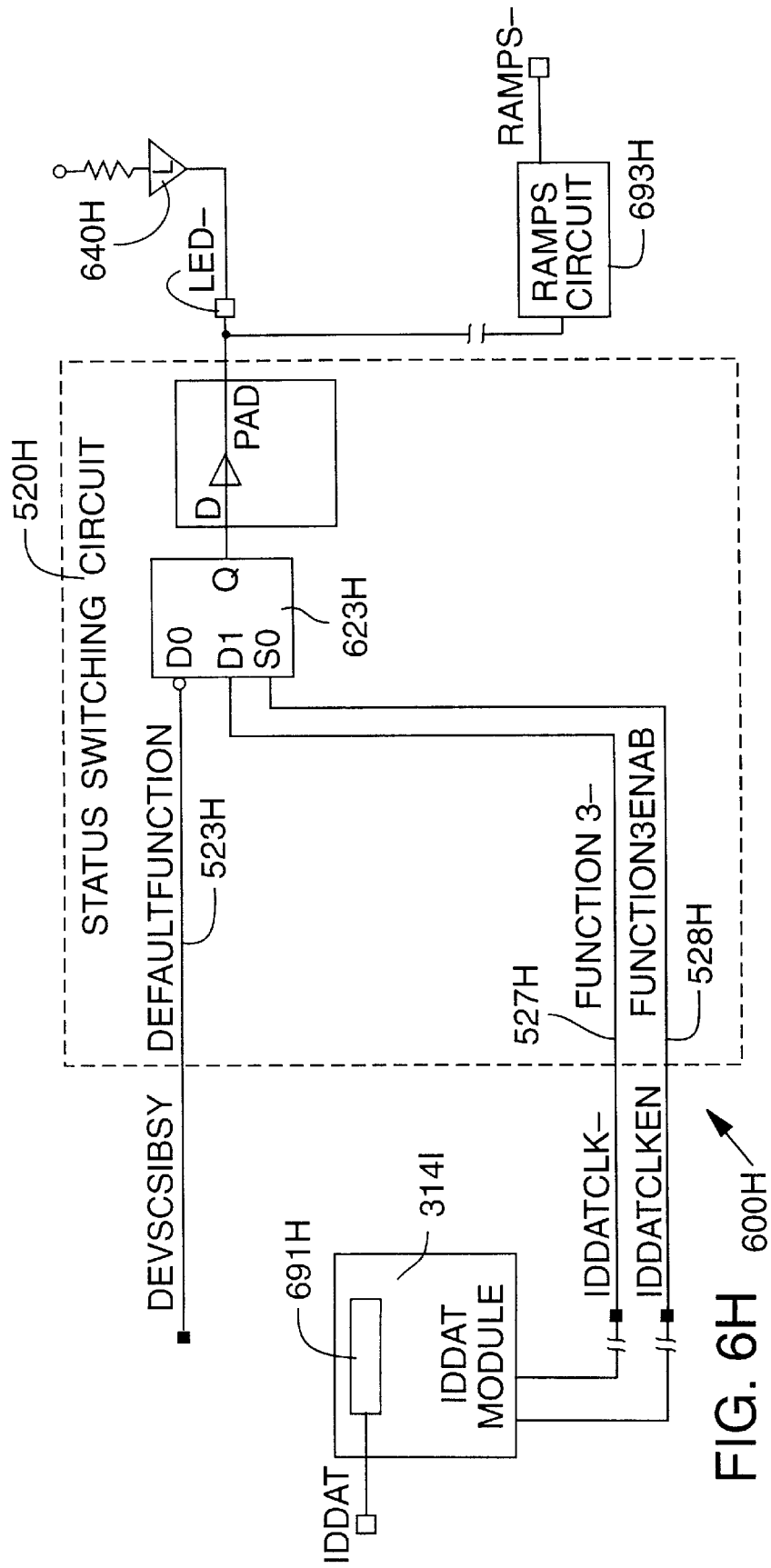

FIG. 6H illustrates another embodiment of status indicator circuit 600H in accordance with this invention. Status indicator circuit 600H is similar to status indicator circuit 600A described above except that status switching circuit 520H has only the third function input line 527H, third function enable line 528H, and a default function input line 523H and is implemented by multiplexer 623H.

An IDDAT module 314I drives input signal IDDATCLK- onto status indicator terminal LED- when control signal IDDATCLKEN is active. Circuity external to host adapter integrated circuit 214 can use output signal LED- to support various function activities such as multi-function uses of one or more pins of host adapter integrated circuit 214, for example, to indicate a pin is available as an output pin or as an input pin.

In one embodiment, IDDAT module 314I uses the positive edge of output signal LED- to clock a user specified device identification number, as described above in reference to FIG. 6A, from pin IDDAT into an internal IDDAT shift register 691H in IDDAT module 314I (FIG. 6H).

In another embodiment, a pin RAMPS- of host adapter integrated circuit 214 can be used either as an input pin to indicate the presence of an external SRAM or as an output pin for a buffered clock signal PCLK. A circuit external to host adapter integrated circuit 214 uses the signal LED- that is generated in response to input signal IDDATCLK- to configure pin RAMPS- appropriately. If an external static RAM is present, pin RAMPS- is used as an input pin and must be grounded when PCI bus reset signal PCIRESET- is deasserted. Conversely, if the pin RAMPS- is to be used as an output pin for a buffered clock signal, for example, pin RAMPS- must be floated before the fourth clock cycle in signal IDDATCLK-.

A circuit internal to host adapter integrated circuit 214, in one embodiment the RAMPS- circuit 693A, determines if pin RAMPS- has an inactive signal, e.g. floating at a high level at a fourth cycle rising edge of signal IDDATCLK- after the PCI bus is reset. If so, the internal circuit switches on an output driver that supplies pin RAMPS- with a clock signal PCLK. Clock signal PCLK is a buffered version of the clock signal of PCI Bus 250 and can be used by circuitry external to host adapter integrated circuit 214.

Alternatively, if pin RAMPS- is grounded during PCI bus reset and remains grounded after the fourth clock cycle of signal IDDATCLK-, an external SRAM is present and clock signal PCLK is not needed by external circuitry, so the internal circuity does not drive clock signal PCLK on pin RAMPS-.

Finally, if an external SRAM is present and it is desired to use pin RAMPS- as a buffered clock output pin, external circuity can use signal IDDATCLK- because signal IDDATCLK- is driven on line LED- by status indicator circuit 214I. Specifically, the external circuit grounds pin RAMPS- upon PCI bus reset and then uses signal LED- as a timer to float pin RAMPS- prior to fourth clock cycle in signal IDDATCLK-. Floating pin RAMPS- results in the internal circuitry sensing a high level on pin RAMPS-. Thus, if pin RAMPS- is low at reset and high at the fourth clock cycle, the internal circuit knows that an external SRAM is present, but pin RAMPS- can be used as an output pin for the buffered clock signal PCLK.

In this embodiment, status switching circuit 520H includes a two-to-one multiplexer 623H with an inverting input terminal D0 that is driven by signal DEVSCSIBSY and a non-inverting input terminal D1 that is driven by signal FUNCTION3- on third signal input line 527H. The operation of multiplexer 623H in response to signal IDDAT-CLKEN is identical to that described above in reference to multiplexer 623A of FIG. 6A.

In alternative embodiments of this invention the status indicator circuit is implemented in 0.8 micron double CMOS process and 0.6 micron double/triple CMOS process. However, a status indicator circuit in accordance with this invention can be implemented in any process known to a person of skill.

Although the present invention has been described in connection with the above described illustrative embodiments, the present invention is not limited thereto. Any other module of the host adapter integrated circuit 214, for example, a DATA FIFO module can drive a function input line and a corresponding function enable line to indicate its status. Moreover, although only three function input lines and a default function input line are described, any larger number can be supported by adding multiplexers to switch the additional lines. Furthermore, in accordance with this invention, the SCSI protocol can be run on a fiber channel interface such as the one described in "Fibre Channel-Physical And Signaling Interface (FC-PH)" that is incorporated by reference herein in its entirety and that is available from Global Engineering, 15 Inverness Way East, Englewood, Colo. 80112-5704. Also instead of the SCSI interface, a different interface can be used for an input/ output bus in accordance with this invention. In view of the enclosed disclosure, the principles of this invention can be applied by persons of skill to various problems that require real time status indication of multiple functions. Various modifications and adaptations of the above discussed embodiments are encompassed by this invention as set forth in the appended claims.

We claim:

1. A method of operating a status switching circuit having a plurality of input lines, an output line and a disable line, said method comprising;

driving a signal on a first input line in said plurality of input lines based on the value of an input storage unit in a status storage element;

detecting an active signal on said disable line;

setting the value of said input storage unit in said status storage element;

disconnecting an output line of said status switching circuit from every one of said input lines;

detecting an inactive signal on said disable line; and connecting said output line to said first input line.

2. The method of claim 1 further comprising:

detecting the use of a bus connected to a host adapter that includes said status storage element; and driving a signal on a second input line of said status switching circuit in response to said step of detecting the use.

3. The method of claim 2, wherein said status storage element includes an enable storage unit, and said method further comprises:

clearing said enable storage unit after firmware is loaded into a host adapter that includes said status storage element.

4. The method of claim 2 further comprising inserting a first write statement at a predetermined location in firmware to set said input storage unit in said status storage element to indicate on said output line that the first write statement has been executed.

5. The method of claim 4 further comprising inserting a second write statement to clear said input bit in said status storage element to indicate that said write statement has been executed.

6. The method of claim 4 wherein said first write statement indicates the beginning of an idle loop and said second write statement indicates the end of said idle loop.

7. The method of claim 2, wherein said step of disconnecting is performed in response to said detection of active signal on said disable line.

8. The method of claim 2, wherein the status switching circuit also has a plurality of enable lines corresponding to the plurality of input lines, and further wherein, the step of connecting said output line to said first input line is performed in response to an active signal on a first enable line corresponding to said first input line, if each enable line other than said first enable line carries an inactive signal.

9. The method of claim 8, wherein the status switching circuit also has a default input line, and the method further comprises:

connecting said output line to said default input line in response to an inactive signal on each of said enable lines.

* * * * *